United States Patent [19]
Rusk et al.

[11] 3,789,912
[45] Feb. 5, 1974

[54] MATCHING PATTERN PLATES

[75] Inventors: Gerald R. Rusk, Maumee, Ohio; Robert E. Koch, Ottawa Lake, Mich.

[73] Assignee: The Freeman Supply Company, Toledo, Ohio

[22] Filed: May 30, 1972

[21] Appl. No.: 257,930

[52] U.S. Cl. .............................................. 164/243
[51] Int. Cl. .............................................. B22c 7/04
[58] Field of Search ............ 164/241, 243, 239, 249

[56] References Cited
UNITED STATES PATENTS
3,213,496   10/1965   Waite.................................. 164/241
3,472,311   10/1969   Rusk.................................... 164/243

*Primary Examiner*—J. Spencer Overholser
*Assistant Examiner*—John S. Brown

[57] ABSTRACT

Method of producing plates having an identical configuration of valleys and lugs thereon so that one plate is interchangeable with another. Flat plates are provided with a pair of individual holes at opposite ends of the plate center line. Thereafter one or more valleys are machined in a predetermined spacing and location from one or both of the locating holes, and the process repeated for a plurality of plates. Lugs are produced by matching one plate with another by means of pins inserted into the locating holes, and injecting a hardenable material into the valleys. This hardenable material is bonded to the opposite plate. The machining operation of the valleys is carried out in a manner to produce randomly spaced ridges along the side surfaces of the valleys which form depressions in the side surfaces of the lugs that are cast therefrom. Molds made from the respective pattern plates have valleys with ridges therein which have an interference fit with respect to lugs of a matching mold.

5 Claims, 9 Drawing Figures

MATCHING PATTERN PLATES

BACKGROUND OF THE INVENTION

In the Carl F. Waite et al. U.S. Pat. No. 3,213,496 there is disclosed a method whereby the bottom surface of one pattern plate is accurately made to dovetail or match with the top surface of another pattern plate using machined surfaces, which are not precisely located. In the procedure taught by the Waite et al patent, the top and bottom pattern plates are abutted and a hardenable material is injected into each valley and is bonded to the abutting surface of the other pattern plate to produce lugs thereon. In the Waite et al design a great number of valleys are required to be machined and the pattern plates can only be economically produced by performing the machining operations quickly without starting and stopping the machining operations in precise locations. While it might be possible for an operator of a milling machine to produce a second pattern plate having the exact length, arrangement, and spacing of valleys which were produced in a first pattern plate of the Waite et al design, it would be an extremely time consuming, tedious and a very expensive operation. All of the pattern plates which are produced by the Waite et al procedure therefore have a more or less random arrangement of valleys and lugs therein, and each pattern plate will only match the pattern plate from which its lugs were cast. When one of the matching pattern plates of the Waite et al patent is damaged, the remaining pattern plate is useless.

In the Rusk et al. U.S. Pat. No. 3,472,311 there is disclosed a pattern plate having valeys and lugs in the top surface which are directly opposite matching lugs and valleys in its bottom surface, so that the parts made from the bottom surface will exactly match parts made from the top surface. Parts can be made therefore from both the top surface and the bottom surface of a single pattern plate, but in order to accomplish this, the top and bottom surfaces of the same pattern plate must be very accurately laid out and produced. Pattern plates of such a design can only be made economically if the pattern plates are cast from a master copy. This dictates that pattern plates having usable top and bottom surfaces can only be made economically by a casting process, and that the accuracy of the pattern plates so produced is limited to the accuracy of a casting operation. Casting processes always involve shrinkage, and shrinkage in turn produces a cast part which is different from the master part by several thousands of an inch at best. Two pattern plates produced from the same master therefore will have a clearance therebetween of twice the shrinkage that is involved in the casting operation. It goes without saying, therefore, that a cast plate can never exactly duplicate the configuration of the master plate.

An object of the present invention is the provision of a new and improved inexpensive pattern plate configuration and process for producing the same, whereby a plurality of pattern plates can be produced which are so precisely alike that the parts made from one pattern plate precisely match with those produced from another pattern plate.

Another object of the invention is the provision of a new and improved method of producing pattern plates of the above described type wherein the parts which are produced from one pattern plate will actually have an interference fit with respect to the parts produced from another one of the pattern plates.

A further object of the invention is the provision of a new and improved plate configuration and method of machining the same whereby the valleys that are machined in one pattern plate can be quickly duplicated in another pattern plate without requiring time consuming set up time of a milling machine.

Further objects and advantages of the invention will become apparent to those skilled in the art to which the invention relates from the following description of the preferred embodiments described with reference to the accompanying drawings forming a part of this specification.

DESCRIPTION OF THE PREFERRED EMBODIMENTS

Figure 1:
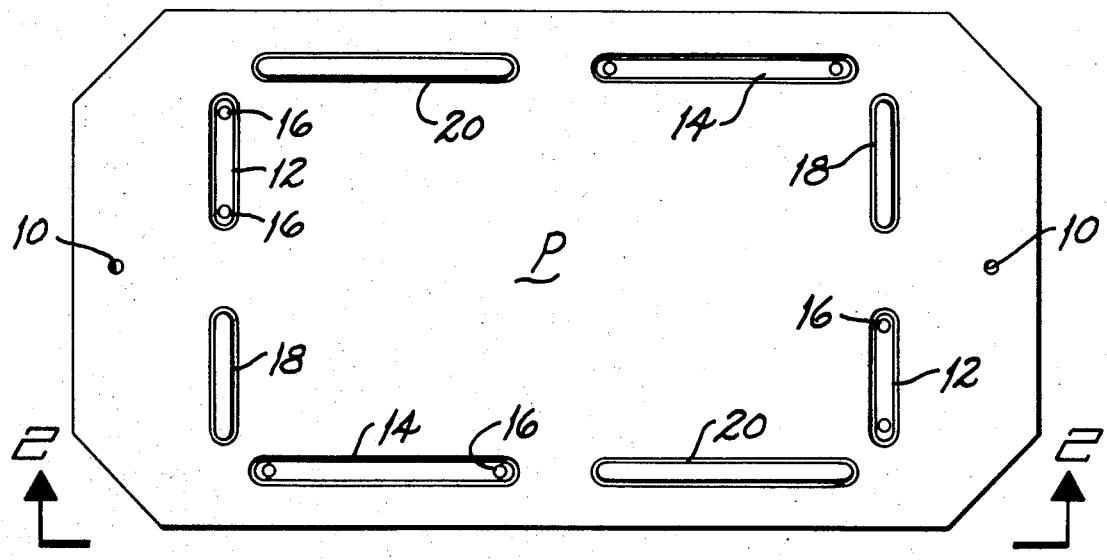
FIG. 1 is a plan view of a pattern plate embodying principles of the present invention.
Figure 2:
FIG. 2 is a side view of the pattern plate shown in FIG. 1 in which only the lugs in the front half of the pattern plate are shown.
Figure 3:
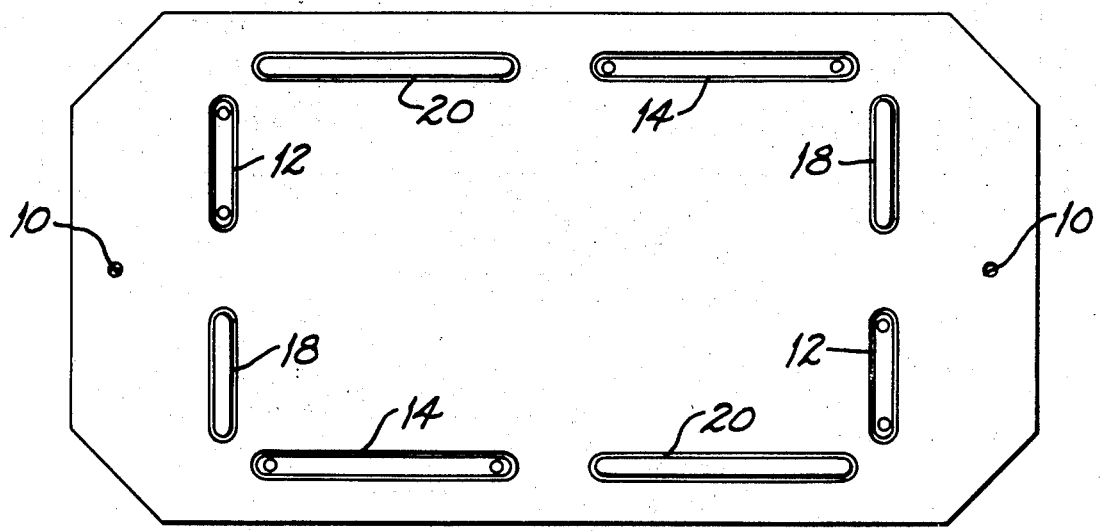
FIG. 3 is a bottom view of the pattern plate shown in FIGS. 1 and 2.

According to the present invention, an inexpensive and quickly performable process is provided for machining the top surface of a plurality of plates in a precise and identical manner, so that all of the parts molded from one pattern plate exactly match those molded from another pattern plate. According to the invention this is accomplished by drilling a pair of holes 10 in a precise spacing in each of the pattern plates, as can be done for example with a pair of spaced drilling arbors which are kept a precise distance apart. The upper surface of these pattern plates "P" are then machined to provide a plurality of transverse valleys 12 therein, which are accurately located relative to the holes 10. The machining operation can be performed in a number of ways, one of which is by a milling machine. In the case of a milling machine, the operation is easily accomplished by installing pins on the bed of the machine to receive the openings 10 of each plate. The milling cutter is centered on one of the openings 10 and the bed of the milling machine is thereafter moved a precise X and Y distance to bring the cutter at the beginning location for the milling operation. The starting location for the milling cutter can also be quickly arrived at by a fixture attached to the head of the milling cutter, which fixture has a pin fixed thereto for entering the upper end of the adjacent hole 10 when the milling cutter is in the proper X and Y dimension from the hole 10. As shown in FIG. 1 of the drawings, a valley 12 is adjacent the left side of the plate and the starting position for milling this valley is quickly arrived at by moving the bed of the milling machine by a precise puls X and a precise minus Y direction as accurately determined by the micrometer dial on the lead screw of the bed of the milling machine. The milling is accomplished by moving the bed in a minus Y direction by a precise distance which can be automatically stopped by a limit switch on the micrometer dial of the machine. Thereafter the milling cutter is raised and the pattern plate is lifted off the pins on the bed of the milling machine. The pattern plate is then rotated end for end to bring the opposite locating hole 10 in register with the locating pin previously used. Thereafter the valley 12 adjacent the right hand edge of the plate as seen in FIG. 1 is machined by moving the bed of the milling machine in a positive Y direction to bring the bed back to its starting position. This process is thereafter repeated for all of the pattern plates.

After a plurality of pattern plates has been machined to provide transverse valleys 12 adjacent the ends of the plates, the bed of the milling machine is moved in a prescribed X and Y direction from the locating hole 10 to bring the milling cutter in a starting position for machining the longitudinal valleys 14. This can be done by using the micrometer on the lead screw of the bed of the milling machine, or by another fixture attached to the head of the milling machine having a pin which is just received in the adjacent hole 10 when the cutter is in the proper position. Thereafter the cutter is lowered and the bed of the milling machine is moved in a minus X direction by a precise predetermined distance to machine a valley 14. This movement can be terminated by a suitable limit switch. The heat of the milling machine is then raised and the plate is again switched end for end to reverse the engagement of the locating holes 10 with the locating pins on the bed of the machine. Thereafter the bed of the milling machine is moved in a positive X direction to machine the opposite valley 14. This process is also repeated for the plurality of plates. It will now be seen that the operation of the milling machine is for the most part a simple automatic back and forth movement, since the pattern plates are accurately located relative to the milling cutter rather than the milling cutter being accurately repositioned to each pattern plate.

Two holes 16 are drilled through each plate to communicate the valleys 12 and 14 with the opposite side of the plate. These openings 16 need not be precisely located or sized. Thereafter, the bottom surface of one of the plates thus machined is matched against or superimposed on the machined top surface of another one of the pattern plates and is alligned by inserting locating pins through the superimposed openings 10. Thereafter, a suitable hardenable plastic is inserted through the openings 16 to fill the valleys 12 and 14 on the top surface of the other plate to produce matching lugs 18 and 20 that are bonded to the top plates by reason of the plastic which hardens in the openings 16. In order to further lock the cast plastic lugs 18 and 20 to the bottom surface of the top pattern plate, the bottom surface of the top pattern plate is preferably provided with shallow grooves 22, which need not be precisely machined, and which can be made in a manner similar to that above described for the valleys 12 and 14.

The process so far described produces valleys 12 and 14 in the top surface of the pattern plates, and lugs 18 and 20 on the bottom surface of the pattern plates which accurately match each other. Because these valleys are precisely machined and are in identical positions in all of the pattern plates, the lugs of one pattern plate will fit the valleys of any of the other pattern plates. The parts produced from the top surface of any one of the pattern plates will therefore fit the molds produced from the bottom surfaces of any of the other pattern plates.

While plates having all valleys on one side, and all lugs on the other, will be acceptable in many instances, the preferred pattern plate shown in the drawings contains both lugs and valleys on each side of the plate. In the preferred embodiment shown in the drawings the valleys on the bottom surfaces have the identical configuration as do the valleys 12 and 14 on the top surfaces and are so numbered. The lugs on the top surface have the identical configuration as the lugs 18 and 20 on the bottom surfaces and are so numbered, and the lugs on one side of the plate are directly opposite corresponding valleys on the opposite side of the plate. With this arrangement, the lugs 18 and 20 on the top surface of the pattern plate are produced without making any further adjustments of the milling machine. This is accomplished by machining valleys in the bottom surface of each pattern plate in the identical manner as were the valleys 12 and 14 in the top of each pattern plate. This is accomplished by lifting each plate off of the alignment pins and rotating the plate about its longitudinal axis to bring the bottom surface on top for the precise same milling operation. The plate is thereafter lowered to bring the pins into the openings 10. A valley 12 is then machined therein. The pattern plate is then turned end for end, and the opposite valley 12 machined. A similar operation is used to machine the valleys 14 in the bottom of the plates. Thereafter the bottom surface of one plate is abutted with the top surface of another plate and the lugs 18 and 20 are cast onto the top surface of the other plate. It will now be seen that the top and bottom surfaces of all of the pattern plates are identically machined by using but two starting settings for the milling cutter.

Still other methods of machining the pattern plates may be found, but regardless of the operation that is used, the pattern plates of the present invention require a minimum of layout for the machining operations. Because the bottom configuration of each plate is exactly the same as the top configuration of each plate, articles from the bottom of any plate will fit the top surface of any other plate. In addition, the pattern plates will match each other when turned end for end or rotated about the longitudinal center line, as will the parts produced therefrom. The preferred pattern plates of the present invention therefore are unique in many ways, and the principles of the present invention are applicable regardless of the number of lugs and valleys that are used in the pattern plate design.

Figure 4:
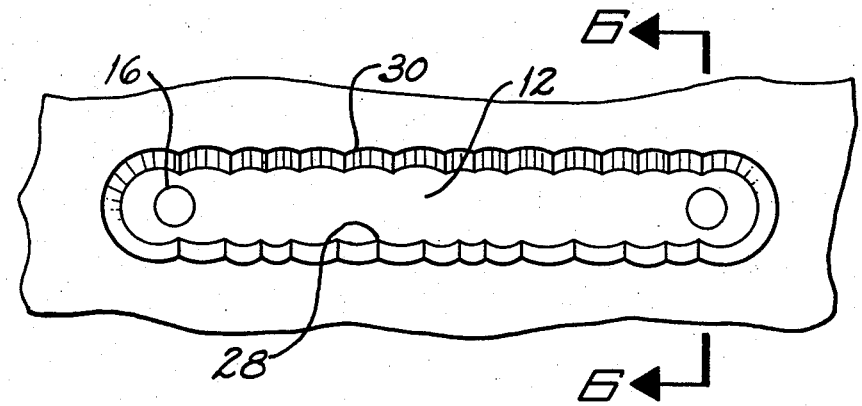
FIG. 4 is a fragmentary view of a tpyical valley provided in the top and bottom surfaces of the pattern plates shown in FIGS. 1 through 3.
Figure 5:
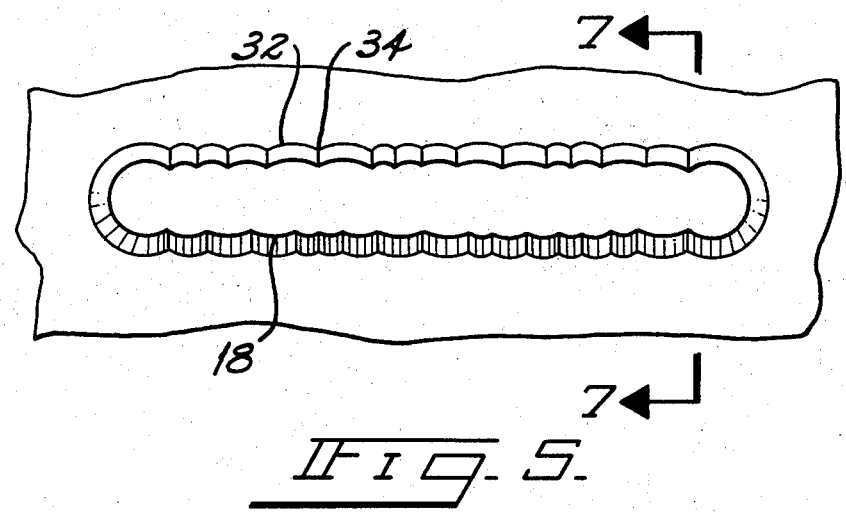
FIG. 5 is a fragmentary plan view of a typical lug shown in the top and bottom surfaces of the pattern plates shown in FIGS. 1 through 3.

According to a further principle of the present invention, the machining of the valleys is done with an irregular small side to side movement of the milling cutter away from a side stop to produce ridges 28 as shown in FIG. 4. This is easily accomplished as will be understood by those skilled in the art by moving a micrometer dial away and against a stop. These ridges are spaced apart by the depressions 30, and the bottoms of the depressions are in line as determined by the stop to form the basic contour of the valley. The ridges 28 have a depth determined by the movement of the milling cutter away from the stop, and preferably have a height of approximately 0.0003 to 0.0006 inch.

A pair of micrometer stops set apart by this distance can be used to hold the bottom of the depressions 30 in line on both sides of the valley. The machining can be done by merely turning the micrometer dial between these two stops while machining in a single direction. When the valleys are to be made wider than the diameter of the milling cutter plus the height of the ridges, the micrometer dial can be moved against and away from one stop while milling in one direction until the end of the valley is reached, followed by stopping the feed and moving the micrometer to the opposite stop. Thereafter the feed of the cutter is reversed and the micrometer dial is moved against and away from the opposite stop by an amount corresponding to the height of the ridges until the cutter returns to its starting position.

Figures 6, 7, 8:
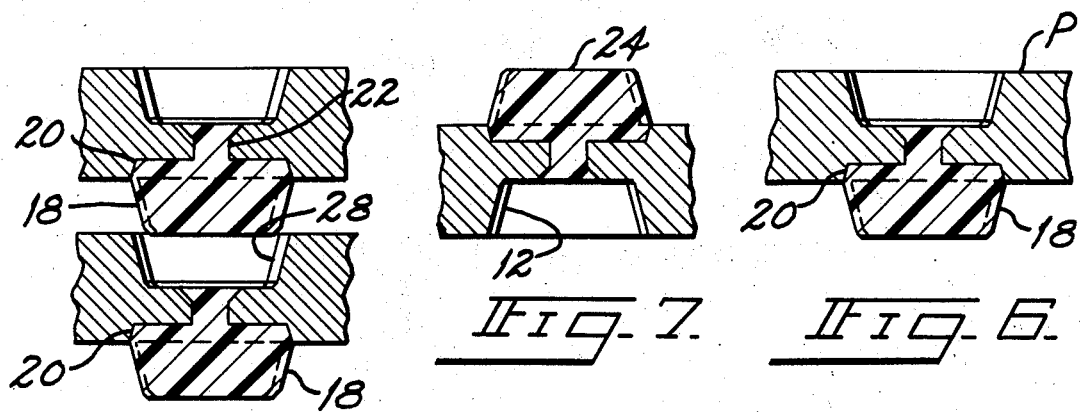
FIG. 6 is a fragmentary sectional view taken approximately on the line 6—6 of FIG. 4.
FIG. 7 is a fragmentary sectional view taken approximately on the line 7—7 of FIG. 5.
FIG. 8 is a telescoping view of the fragmentary sections shown in FIGS, 6 & 7 and showing how the fragmentary elements have an interference fit when matched with each other.
Figure 9:
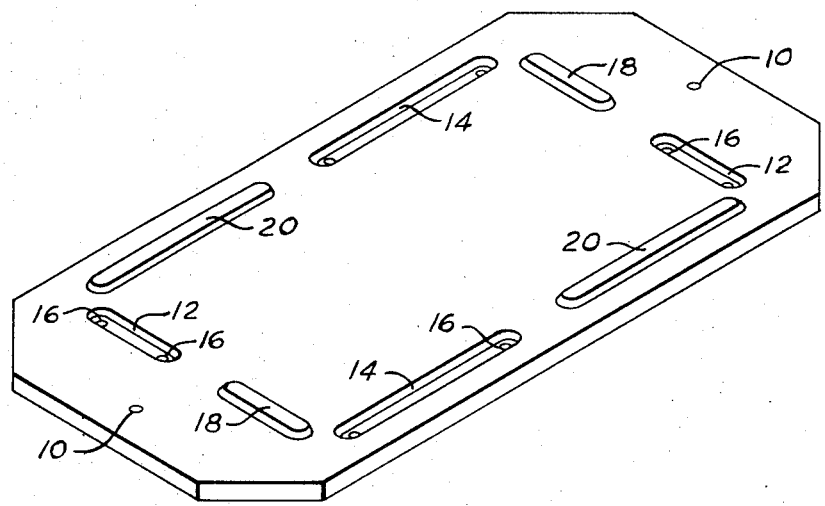
FIG. 9 is an isometric view of the pattern plate shown in FIGS. 1 through 8, and is taken above and in front of the pattern plate as oriented in FIG. 1.

It will now be seen that when the lugs are cast from valleys having the ridges 28 therein, raised areas 32 are produced in the lugs corresponding to the depressions 30, and grooves 34 are formed corresponding to the ridges 28. It will further be seen that the ridges 28 of each valley will never coincide with the ridges of another valley, since the ridges are made by random and irregular movement. Likewise the ridges of a part molded from one plate will not match the grooves in a lug molded from another plate; and so that the ridges of molded parts engage raised areas 32 of other molded parts when matched therewith. In FIG. 8 there is shown matching pattern plates wherein the lug 18 in the bottom of the top plate is in a telescoping position with respect to the valley 12 of the bottom pattern plate. The view shows the type of interference fit which the ridges 28 have with the raised areas 32. The sand molds made from the pattern plates are only used once and the ridges 28 of these molds are deformed by the raised areas 32 of a matching mold to provide a precise fit that does not allow any relative movement whatsoever. What is more, this arrangement allows the parts having the interference fit to be pressed together without cracking the molded sand, since grooves 34 are positioned laterally from each ridge 28 to receive the crushed sand.

It can now be seen that the objects heretofore enumerated as well as others have been accomplished, and that there has been provided a pattern plate design and a method of producing the same whereby identical pattern plates can be produced at a cost that is no greater than the cost of producing the pattern plates of the prior art.

While the invention has been described in considerable detail, we do not wish to be limited to the particular embodiments shown and described and it is our intention to cover hereby all novel adaptations, modifications, and arrangements thereof which come within the practice of those skilled in the art to which the invention relates.

We claim:

1. Plate means for producing locking molded parts comprising: plate means having matching flat surfaces with a lug projecting outwardly from one surface and a matching depression extending inwardly from the other flat surface, said depression having a side surface formed by concave identations extending generally perpendicularly to the flat surface in which they are located and the bottoms of said concave identations defining a plane, said side surface also having ridges between said concave identations, said lug having a side surface with convex projections extending generally perpendicularly to the flat surface in which said lug is situated, said convex projections having their outer surfaces positioned in a plane and being randomly spaced apart along said plane, whereby a first part molded from said depression is a lug with randomly spaced convex surface projections and a part molded from said lug is a depression with randomly spaced ridges therein adapted to randomly engage said convex surface projections of said lug.

2. The plate means of claim 1 wherein said ridges are formed by the intersection of said concave surface indentations.

3. The plate means of claim 1 wherein: said lug has opposite side surfaces both of which are formed by convex surface projections the outer surfaces of which define two sides of a cross section that has the shape of an isosceles trapezoid, and said depression has opposite side surfaces both of which are formed by concave surface identations the bottoms of which define a cross section of the same isosceles trapezoidal shape as said convex surface projections of said lug.

4. The plate means of claim 3 wherein said surface projections have a depth greater than machining tolerances of said plate means to form ridges in molded parts produced from said lug which are deformed by the convex surface projections of molded parts produced from said depressions when said molded parts are brought into engagement with each other.

5. A pattern plate having generally flat opposing faces each of which has a center line defined by the intersection of an imaginary plane that is perpendicular to said faces with said faces, one of said faces having a valley therein in a predetermined location from its center line, said valley having opposing side surfaces each of which are defined by concave surface indentations therein, the bottom of said indentations being aligned and the valley having a cross section as defined by the aligned bottoms of the indentations which is an isosceles trapezoid, and said indentations of each side having ridges therebetween that are irregularly spaced, said other of said faces having a valley which is positioned from the center line of its face in the identical manner as is said valley in said one of said faces, said valley having a shape that is identical with said valley of said one of said faces excepting that the indentations of its sides do not correspond in spacing arrangement with those in said one of said faces, and whereby a lug of a part molded from said other face fits said valley in said one of said faces with the convex projections of the lug being in random engagement with said ridges of said valley.

* * * * *